(12) United States Patent
Plessala (10) Patent No.: US 6,679,512 B1
(45) Date of Patent: Jan. 20, 2004

(54) TRACTOR HITCH GUIDE

(76) Inventor: Dickie M. Plessala, 7780 Raintree La., Orange, TX (US) 77630

( * ) Notice: Subject to any disclaimer, the term of this patent is extended or adjusted under 35 U.S.C. 154(b) by 0 days.

(21) Appl. No.: 10/259,473

(22) Filed: Sep. 30, 2002

(51) Int. Cl.$^7$ ................................................ B60D 1/99
(52) U.S. Cl. ...................................... 280/504; 280/460.1
(58) Field of Search ................................ 280/504, 514, 280/460.1, 478.1, 479.3

(56) References Cited

U.S. PATENT DOCUMENTS

| | | | |
|---|---|---|---|
| 2,871,029 A | 1/1959 | Demarest | 280/477 |
| 2,973,971 A | 3/1961 | Oddson | 280/478 |
| 3,837,316 A | * 9/1974 | Stratienko et al. | 114/249 |
| 3,912,119 A | 10/1975 | Hill et al. | 280/478 A |
| 4,077,234 A | * 3/1978 | Crochet, Sr. | 464/119 |
| 4,350,362 A | 9/1982 | Landers | 280/478 A |
| 4,560,183 A | 12/1985 | Cook | 280/477 |
| 4,991,865 A | 2/1991 | Francisco | 280/477 |
| 5,009,446 A | 4/1991 | Davis | 280/479.2 |
| 5,129,667 A | * 7/1992 | Gratton | 280/493 |
| 5,193,838 A | * 3/1993 | Olson | 280/515 |
| 5,261,687 A | * 11/1993 | Bergman | 280/478.1 |
| 6,286,852 B1 | * 9/2001 | Slatten | 280/479.3 |

* cited by examiner

Primary Examiner—Lesley D. Morris
Assistant Examiner—L. Lum
(74) Attorney, Agent, or Firm—Richard C. Litman (57) ABSTRACT

The tractor hitch guide is a modification of a three-point tractor hitch and of the corresponding pinning structures of the implement. The modified tractor hitch includes bushings located on the links of the two side arms, to extend the openings of the links in a direction coaxially outward with the openings. The modified pinning structures of the implement include a spring-loaded latching pin that automatically latches with the link when it is in its aligned position. Centering brackets are provided for horizontally aligning the links and a spring-loaded leveling plate is provided for vertical alignment, when the tractor is backed into the implement.

5 Claims, 8 Drawing Sheets

TRACTOR HITCH GUIDE

BACKGROUND OF THE INVENTION

1. Field of the Invention

The present invention relates to modified tractor hitches and modified guides on the implements for receiving the tractor hitches. More particularly, the invention is a modification of a standard 3-point hitch on agricultural tractors, and a corresponding modification of the pinning structure (i.e., guides) on the implements. The modification allows the tractor operator to align and automatically connect the implement pinning area to the tractor hitch by simply backing the tractor into the implement.

2. Description of the Related Art

Various self-aligning structures for connecting a pulling vehicle (tractor) to a pulled vehicle (implement) using a three-point hitch are known in the agricultural field. In accordance with the standard specification set by the American Society of Agricultural Engineers (ASAE), the three-point hitch used in agricultural tractors includes two lower side arms and an upper arm, each arm having a link (an opening) at its end for connecting to corresponding pinning areas on implements. After the hitch is aligned with the corresponding pinning areas, latching pins are inserted to hold the tractor hitch securely to the implement.

There is a need, however, for a structure that permits the tractor hitch to automatically engage the corresponding pinning areas, i.e., to automatically engage the latching pin with the corresponding hitch links when the hitch is aligned.

A discussion of the related art follows.

U.S. Pat. No. 2,871,029, issued to Demarest on Jan. 27, 1959, teaches a tractor hitch for facilitating hitching a tractors to a trailer. U.S. Pat. No. 2,973,971, issued to Oddson on Mar. 7, 1961, teaches a coupling and alignment mechanism for tractors and trailers.

U.S. Pat. Nos. 3,912,119, issued to Hill et al. on Oct. 14, 1975, U.S. Pat. No. 4,350,362, issued to Landers on Sep. 21, 1982, U.S. Pat. No. 4,560,183, issued to Cook on Dec. 24, 1985, and U.S. Pat. No. 4,991,865, issued to Francisco on Feb. 12, 1991, all teach self-aligning trailer hitches. U.S. Pat. No. 5,009,446, issued to Davis on Apr. 23, 1991, teaches a self-aligning coupling for aligning a tractor link prior to connecting the tractor to an implement.

None of the above inventions and patents, taken either singly or in combination, is seen to describe the instant invention as claimed. Thus a modified tractor hitch and corresponding modified implement pinning structure solving the aforementioned problems is desired.

SUMMARY OF THE INVENTION

The present invention is a modification of a three-point tractor hitch as well as a modification of the corresponding pinning structures on an implement. Implements, for example, include harrows, stump grinders and plows. The tractor hitch is modified to include outwardly extending bushings at the link openings located at the ends of the two side arms of the hitch. The bushings engage with the modified pinning structure to latch the tractor hitch to the implement.

The modified pinning structures on the implement include a spring-loaded latching pin that automatically passes through the link opening when it is in its aligned position. Centering brackets are provided for horizontally aligning the links and a spring-loaded leveling block is provided for vertical alignment, which occurs when the tractor is backed into the implement.

The latching pin in the pinning structure of the implement is spring-loaded to be biased toward an extended position, i.e., to latch with the corresponding link opening. Before latching the tractor hitch to the implement, however, the latching pin is set in a retracted position by pulling the pin outwardly using a handle. When the latching pin is set, its tip rests against the side of the leveling block. Then the tractor is moved in a reverse direction to back the two hitch side arms toward the pinning structure of the implement to engage the link bushings with the pinning structure. The hitch side arms enter the corresponding centering brackets (one set on each side of the implement) and then abut the corresponding leveling blocks.

When the link openings at the ends of the hitch side arms are in proper alignment, then the latching pin automatically engages the link opening of the tractor hitch side arm, by passing through the link opening under bias pressure by a latching pin spring. This latches the tractor hitch to the implement pinning structure, thus connecting the tractor to the implement. A safety retainer pin can then be inserted into the hole at the tip of the latching pin.

Accordingly, it is a principal object of the invention to provide a modified tractor hitch and corresponding modified implement pinning structure including a spring-loaded latching pin that automatically latches the tractor hitch to the pinning structure.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
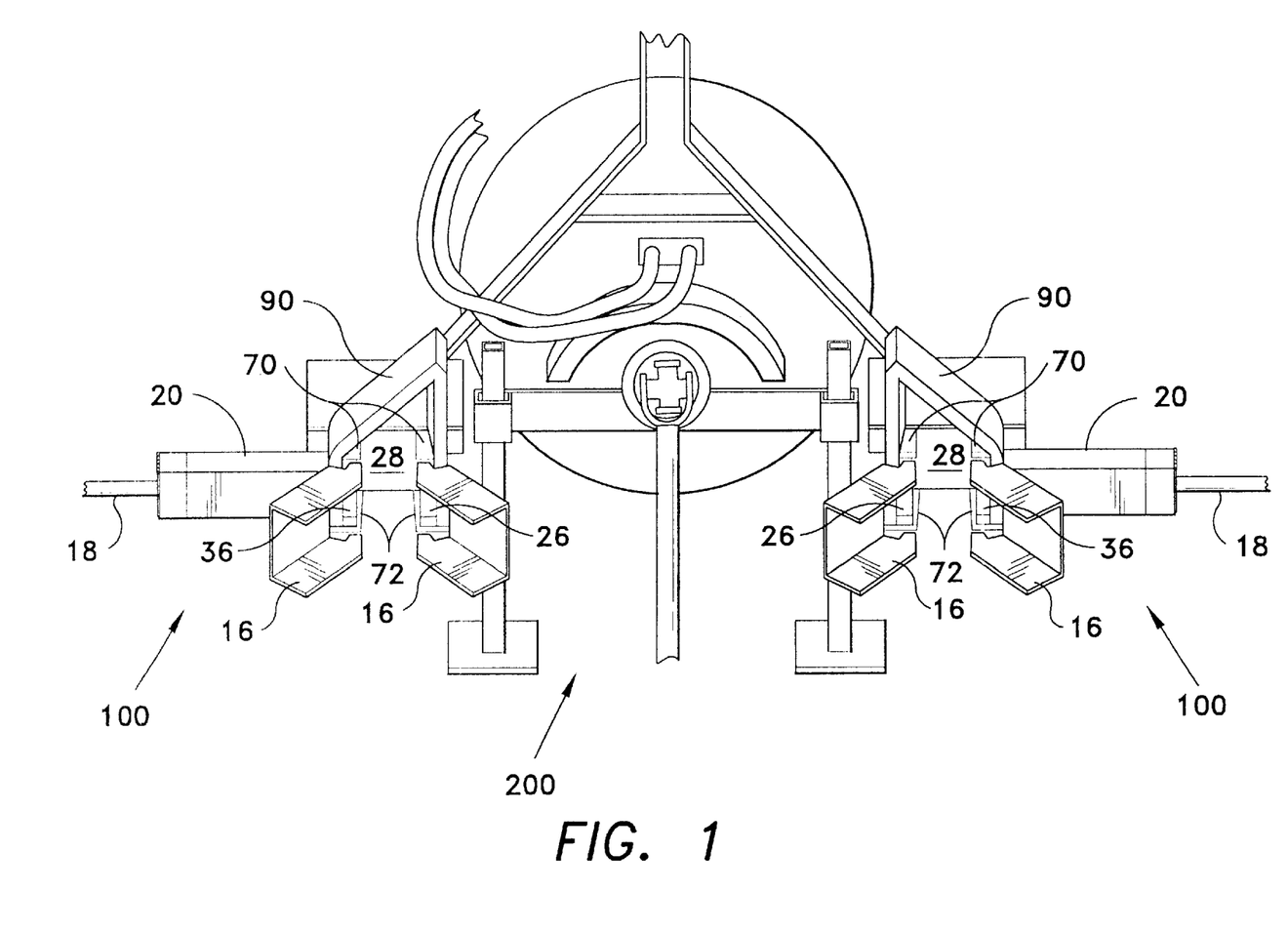
FIG. 1 is an environmental, perspective view of a modified implement showing the modified implement pinning structure according to the present invention.
Figure 5:
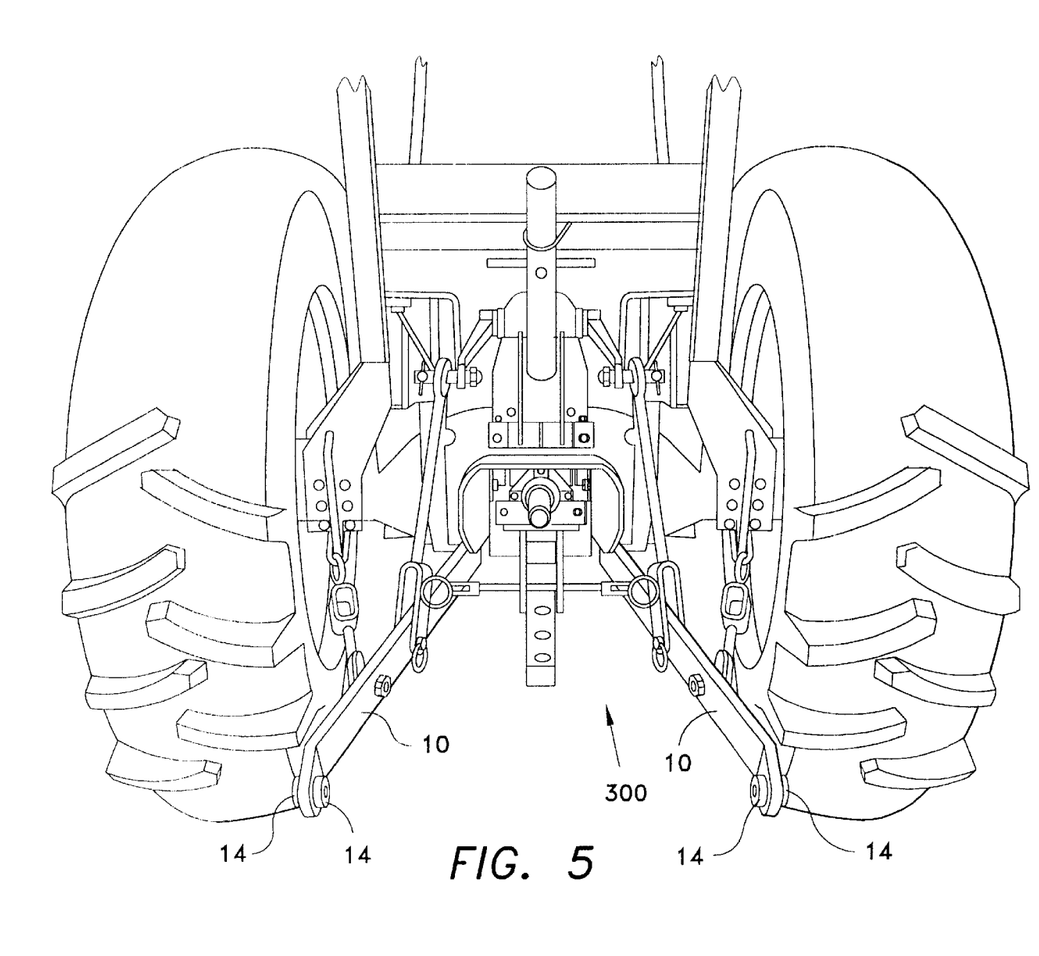
FIG. 5 is a perspective view of a 3-point hitch on a tractor including the inventive modified links.

FIGS. 1 and 5 show the modified pinning structures 100, one on each side of the implement 200, and the modified tractor hitch 300, respectively. In order to latch the tractor to the implement, the tractor is moved in a reverse direction until the modified links at the ends of the side arms 10 of the hitch engage with the corresponding modified pinning structures 100, thereby "latching" the tractor with the implement. Although not shown in the Figures, the top link from the 3-point tractor hitch must also be connected to the corresponding existing pinning structure on the implement. However, since neither the top link of the tractor hitch nor the upper pinning structure of the implement are modified in the present invention, no further discussion regarding either of these top structural members will be provided. It is noted, nonetheless, that in order to completely "latch" the implement to the tractor hitch to be able to use the implement, all three links from the hitch must be properly connected to the corresponding pinning structures on the implement.

In FIG. 1, the modified pinning structures 100 are shown with the centering brackets 16 clearly visible. These brackets provide horizontal alignment for the hitch links. Implement pinning support brackets 90 that are typically found on agricultural implements, are modified to permanently attach the inventive structure thereon, e.g., by welding. The style of support bracket may differ among various implements and among manufacturers. The particular style of bracket 90 shown in FIG. 1, however, is considered representative.

More particularly, FIG. 5 shows the inventive modification of the hitch 300 of a tractor in which the links at the ends of the two side arms 10 have been modified to extend the opening of the link in a direction outwardly from the sides of the arms and coaxially with the link openings using bushings 14. Typically, the link openings at the ends of the hitch arms contain bushings that are capable of swiveling inside the openings so that the pin can still align with and pass through the bushing despite it being slightly misaligned when the side arms 10 enter the pinning structure 100 slightly askew. Therefore, the bushings themselves are modified to extend further outwardly from the link openings, e.g., by welding additional portions to the existing bushings or providing longer bushings.

When the tractor is backed into the implement to latch the tractor with the implement, the modified (extended) bushings 14 at the ends of the two side arms 10 of the tractor hitch enter the pinning structure 100 of the implement 200.

Figure 2:
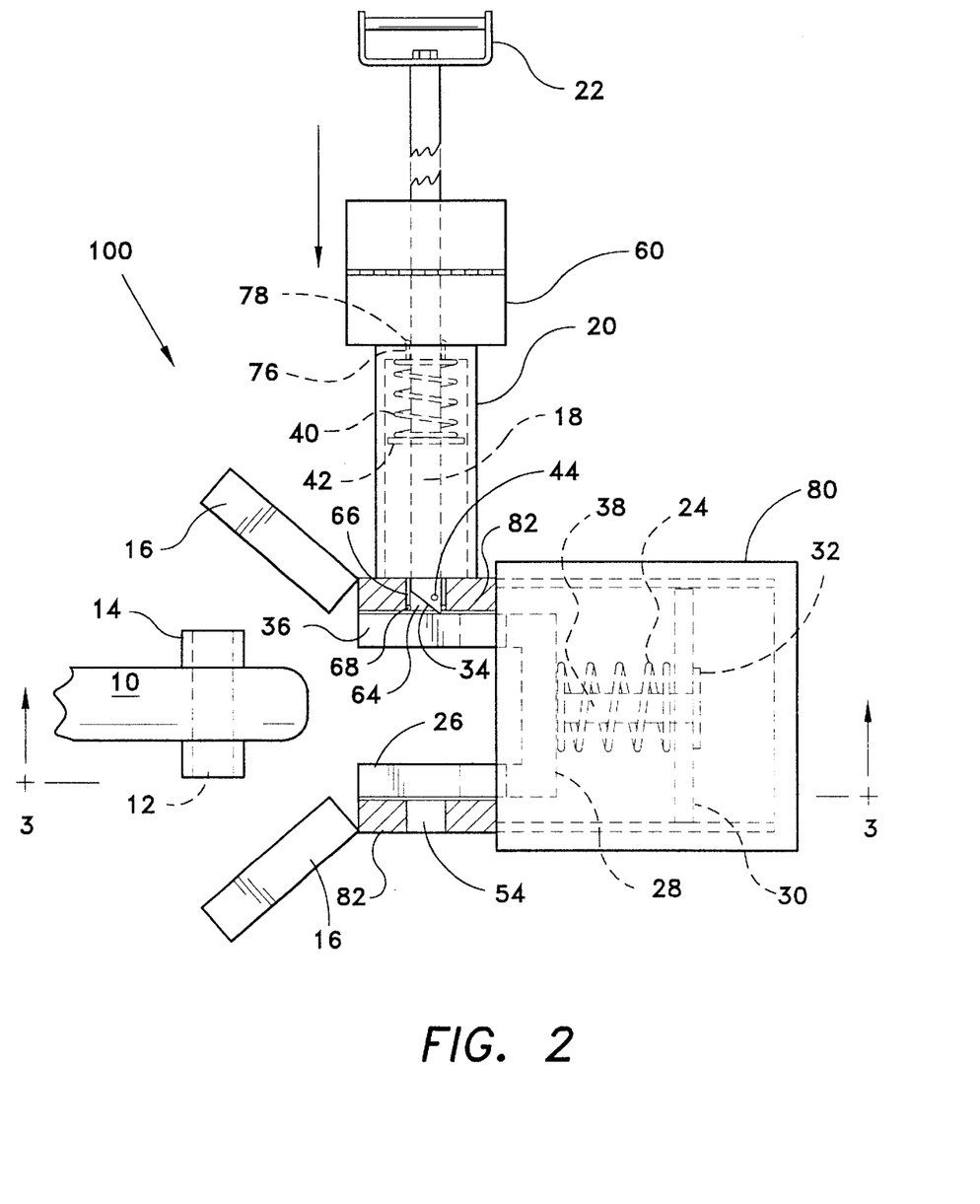
FIG. 2 is a plan view of a cross-section of the modified implement pinning structure.
Figure 3:
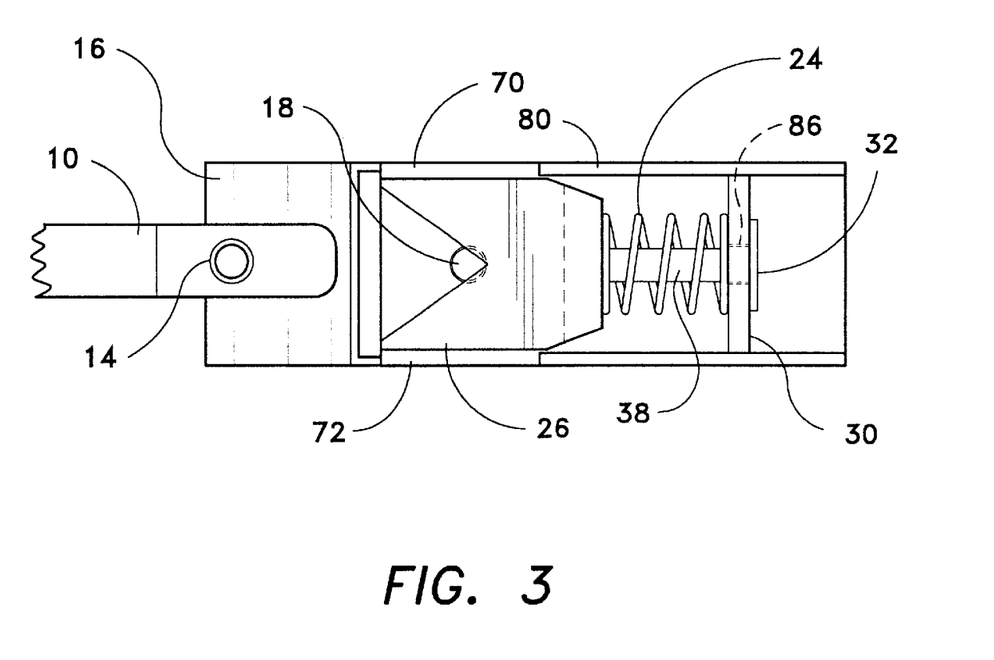
FIG. 3 is an elevation view of a cross-section of the modified implement pinning structure with the latching pin in the retracted position, showing a portion of the tractor hitch arm with the modified link.
Figure 8:
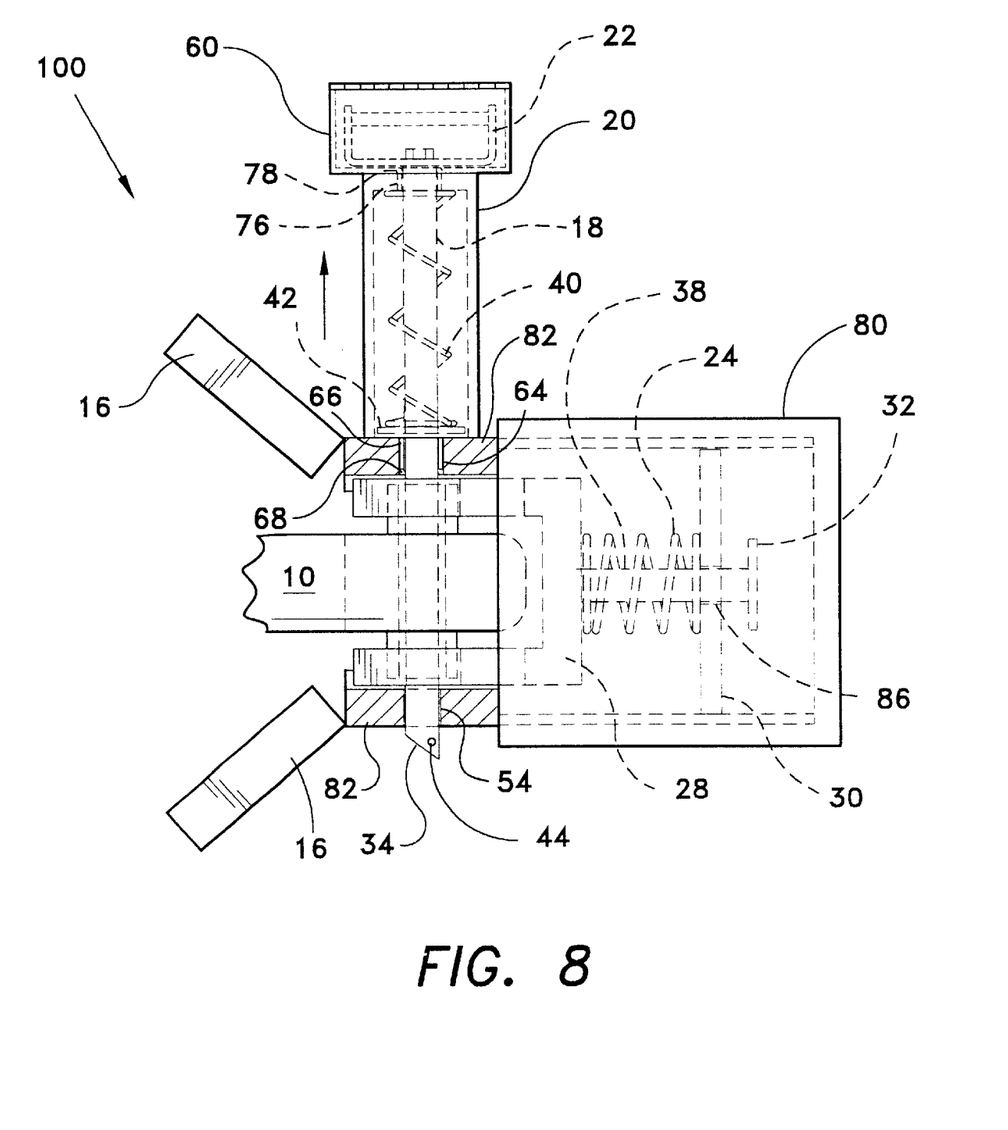
FIG. 8 is a plan view of a cross-section of the modified implement similar to FIG. 2, but showing the latching pin engaged with the link, i.e., the trailer hitch is latched to the implement.

This is shown in greater detail in the plan and elevation views shown in FIGS. 2, 3 and 8.

The latching pin 18 in the pinning structure 100 can be either in a fully "set" (i.e., retracted) position, as shown in FIG. 2, or in a fully "latched" (i.e., extended) position, as shown in FIG. 8. In FIGS. 2 and 3 the latching pin 18 is shown in the "set" position. The latching pin 18 is shown inside its housing 20 with the latching pin spring 40 biasing the latching pin toward the "latched" position, but is prevented from fully extending by the fixed leveling block plate 30.

FIG. 8 shows a plan view cross-section of the implement pinning structure in which the latching pin 18 is in the "latched" position. Note that although the dimensions of the elements of the structure are not necessarily all to scale, the dimensions of the, latching pin 18 are selected to ensure that the pin 18 in the latched position extends through the link and beyond the guide housing wall 82 as shown in FIG. 8.

In the "set" position shown in FIG. 2, the latching pin handle 22 extends out from its housing 20. One end of latching pin spring 40 rests against a stationary plate near the rear of the housing 20. The other end of spring 40 rests against a spring stop 42 that is permanently secured to the latching pin 18 at a position about midway along the pin 18. The spring 40 in the "set" position is in a state of compression.

Figure 6:
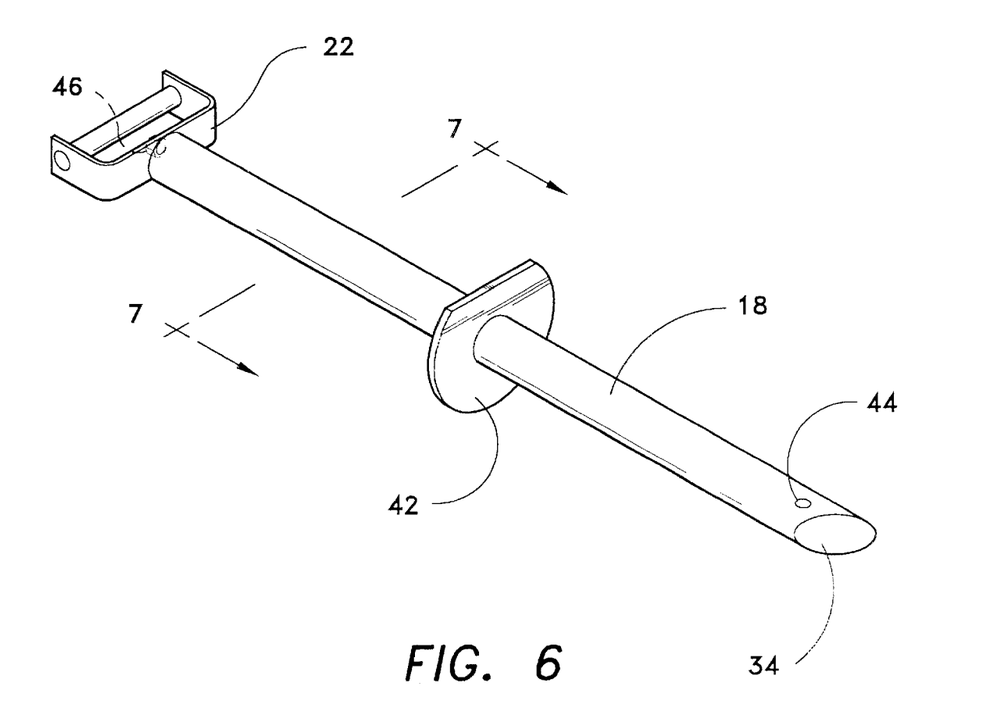
FIG. 6 is a perspective view of the latching pin.
Figure 7:
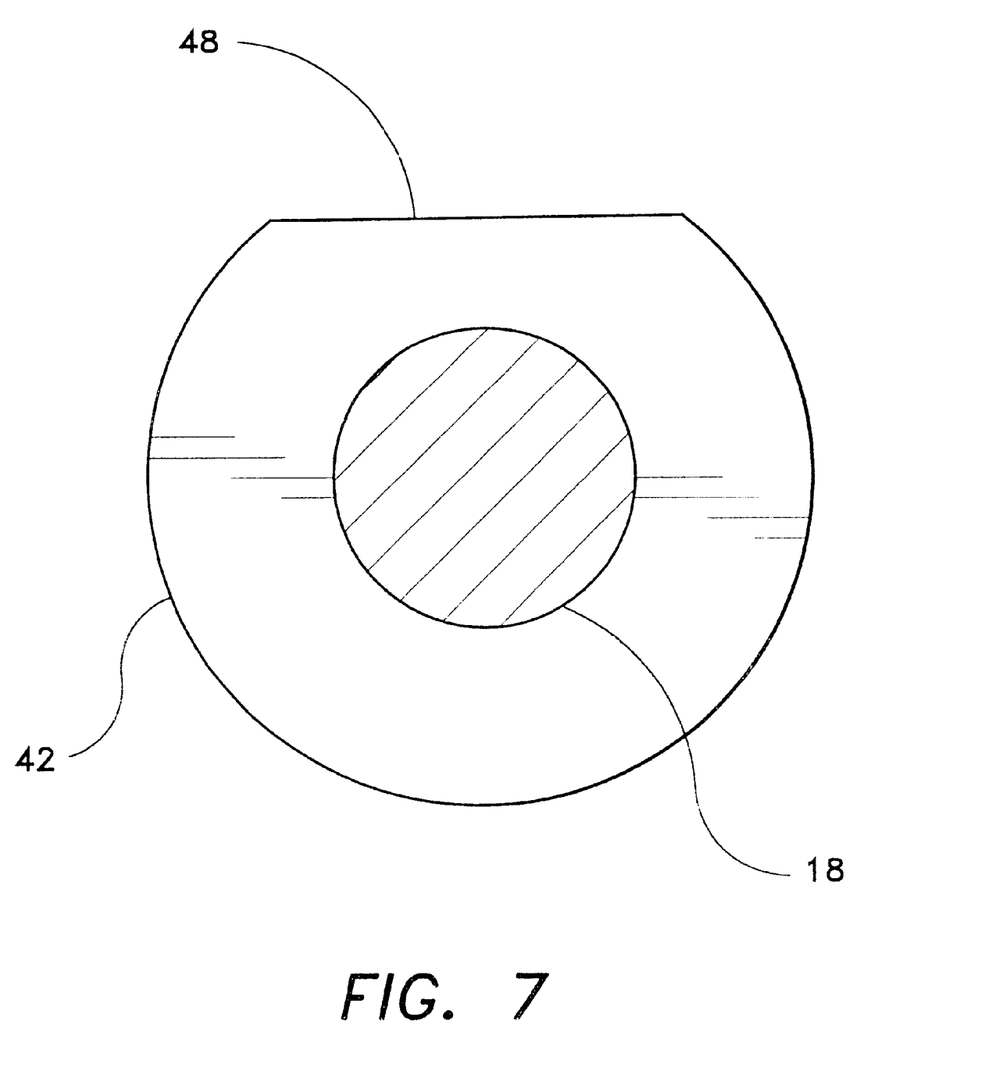
FIG. 7 is a cross-sectional view of the latching pin of FIG. 6.

Details of the latching pin 18 are shown in FIGS. 6 and 7, showing the spring stop 42 on the pin 18. Pin handle 22 is attached to the pin 18 with a fastener element 46, e.g., a bolt. A hole 44 is provided at the tip of the latching pin 18. When the implement is fully connected to the tractor hitch, i.e., the links in the ends of the two side arms 10 are fully in place in the receiving structure, the spring-loaded latching pin 18 extends through the link opening 12 defined by the bushings 14 in the links at the ends of side arms 10 to appear on the opposite side of the guide housing 82. A retaining pin, e.g., a cotter pin, linchpin, hitch pin, etc. is then placed in the opening 44 at the end of the latching pin 18 to hold the pin 18 in place. Once the linchpins are in place, the top link (not shown) from the tractor hitch is then attached to the corresponding receiving bracket (not shown) on the implement pinning structure and a corresponding latching pin and retaining pin are inserted. This completes the latching of the implement to the tractor and the latched implement can then be used.

In order to place the pinning structure into the "set" position, the latching pin 18 is pulled outward by its handle, thereby compressing spring 40. When the tip of the latching pin 18 clears leveling plate 36, the leveling block is pushed outward by spring 24. Spring 24 rests on one side against stationary leveling block plate 30 and on the other side against the rear plate 28 of the leveling block. Compression spring 24 is concentrically aligned about rod 38 which is slidable through a bushing 86 defined in stationary rear plate 30. End disc 32 is attached directly to rod 38 and sets the maximum extension of the leveling block, as well as keeping the leveling block connected to the guide housing.

Also, in order to ensure that the latching pin 18 moves out of the way of the link bushings 14 during latching, the tip of the latching pin 18 is given a chisel tip 34. The link bushing 14 can rub against the chisel surface of the tip 34 during latching, causing the latching pin 18 to retract slightly. Then, when the link bushings 14 are fully aligned and the tip 34 of the latching pin 18 clears the edge of the link opening 12, the latching pin 18 extends, thereby latching.

As shown in FIG. 7, a flattened portion 48 is provided along the outer edge of the spring stop 42, which moves against a corresponding flat surface inside the latching pin housing 20 to ensure that the latching pin 18 does not rotate around its axis. This ensures that the chisel tip 34 of the latching pin is always oriented to face the link during latching.

Figure 4:
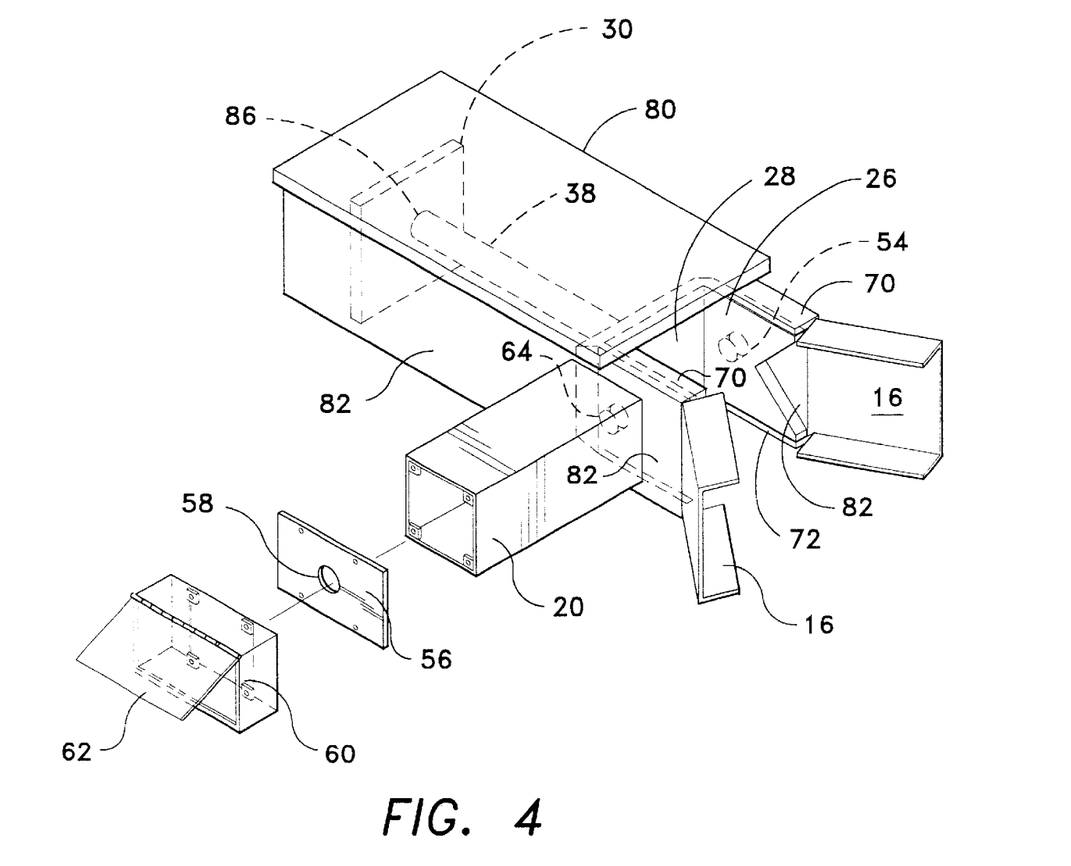
FIG. 4 is an exploded view of the pinning structure housing.

An exploded view of the latching pin housing 20 and guide housing is shown in FIG. 4. Centering brackets 16 ensure horizontal alignment of the bushings 14 during latching. The guide housing comprises a box tube 80 which is welded or otherwise attached to the implement, together with a pair of parallel side walls 82 extending forward from the tube 80. Each side wall 82 has a top flange 70 and a bottom flange 72 attached to the top and bottom edges of the wall 82 and extending towards the opposing parallel side wall 82. The side walls 82, top flanges 70 and bottom flanges 72 define essentially C-shaped opposing channels or tracks in which the side plates 26 and 36 of the leveling block slide. The top flange 70 and bottom flange 72 prevent the leveling plates 26 and 36 from rocking up or down when the tractor backs the bushings 14 against the leveling block.

Each leveling block is made up of three vertical plates fastened together, e.g., by welding or bolting, to form a U-shape when looking down on the structure as seen in FIGS. 2 and 8, including side leveling plates 26 and 36 and connector plate 28. The leveling block is attached to the guide housing tube 80 by rod 38 which has one end attached to the rear of plate 28 and which slides through opening 86 in the stationary plate 30 in the rear of the housing tube 80 (spring 24 is omitted from FIG. 4 for clarity). Disk 32 is attached to the opposite end of rod 38. Guide housing side walls have holes 54 and 64 defined therein. Holes 54 and 64 are slightly larger in diameter than latch pin 18, and are in registry so that latch pin 18 extends through holes 54 and 64 in the extended position shown in FIG. 8.

The V-shaped notches in leveling block side plates 26 and 36 align the bushings 14 vertically as the tractor is backed towards the implement, i.e., if the bushings 14 contact the lower leg of, the notch, the bushings 14 slide up the lower leg to align the opening 12 defined by the bushing 14 with the holes 54 and 64 as the leveling block is pushed backward to compress spring 24. Similarly, if the bushings 14 contact the upper leg of the V-shaped notch, the bushing 14 slides downward to align opening 12 with holes 54 and 64 as the leveling block compresses spring 24. When opening 12 and holes 54 and 64 are aligned, compression spring 40 expands to force latch pin 18 through the aligned holes, where it is then secured by a linchpin inserted through hole 44 in the end of pin 18.

The latching pin (not shown in FIG. 4) moves back-and-forth inside its housing 20. Holes 58 and 64 contain bushings and keep the latching pin 18 aligned in its housing 20. A rear support plate 56 provides an engagement surface for the latching pin spring. A latching pin handle housing 60 is also shown. The handle housing 60 protects the handle 22 when the latching pin 18 is in the latched position, as shown in FIG. 8. A cover 62 for the handle housing 60 provides additional protection, e.g., from debris and the environment.

Also shown in FIG. 8 are bushings, 66 and 76, and corresponding wiping seals, 68 and 78, through which the pin 18 moves when latching or setting. The wiping seals, 68 and 78, can be made of any suitable material, such as TEFLON, that adequately wipe the pin 18 during its movement, thereby preventing unwanted external or other environmental debris from entering the inside of the pin housing.

The dimensions of the modifications depend upon the particular Category of 3-point hitches being modified. The ASAE has designated four Categories, ranging from Category 0 to Category 3, depending upon the horsepower rating of the tractor. Category 0 includes the smallest tractors, i.e., less than 20 hp, and Category 3 includes the largest, most powerful tractors, rated above 95 hp. The size of the latching pins for the different Categories increase with Category. The sizes and dimensions for the modified hitch and modified pinning structure will also increase accordingly.

The entire modified pinning structure can be fastened together either using bolts or by welding.

Also, since implement pinning structures generally vary according to such factors as the type of implement and manufacturer, the resulting modified structures may appear different from the those shown in the figures, particularly FIG. 1. For example, the bracket 90 might have a different shape than the one shown in FIG. 1.

It is to be understood that the present invention is not limited to the embodiments described above, but encompasses any and all embodiments within the scope of the following claims.

I claim:

1. A tractor hitch guide for automatically latching a tractor hitch to an implement to be towed, comprising:

two side arms adapted for attachment to and extending from a rear of a tractor, each arm having an elongated, horizontally oriented bushing extending to opposite sides of the arm, each said bushing having a central opening therethrough;

a pair of implement hitch pinning structures adapted for attachment to two link arms of a farming implement to be towed by the tractor, each pinning structure including:

a guide housing having parallel opposed walls, each wall having a hole defined therein, the holes being in registry, said guide housing having an entrance;

a rear plate and two side plates joined to define a U-shaped leveling block, said leveling block being slidable in said guide housing, each side plate having a leading edge with a rearward extending V-shaped notch defined therein, each V-shaped notch being disposed in a vertical plane;

leveling block bias means for biasing said leveling block in a forward position;

a pair of centering brackets attached to the opposed walls of said guide housing, said centering brackets defining a horizontally disposed V-shaped guide narrowing towards the entrance of said guide housing;

a latch pin disposed orthogonal to said guide housing, said latch pin being in registry with the holes defined in the opposed parallel walls of said guide housing; and latch pin bias means for biasing said latch pin to an extended position wherein said latch pin extends through the holes defined in the opposed parallel walls of said guide housing;

wherein the side plates of said leveling block prevent said latch pin from extending through the holes in the opposed walls of said guide housing when said latch pin is in a retracted position; and wherein said bushings are aligned horizontally by said centering brackets and aligned vertically by the V-shaped notches defined in the side plates of said leveling block when the tractor is backed up to the implement in order to move said leveling block to a retracted position and align the openings defined by each said bushing with the holes defined in each said guide housing, said latch pin automatically extending through the openings and holes upon alignment so that the tractor hitch is automatically latched to the implement hitch pinning structure.

2. The hitch guide of claim 1 comprising a latch pin housing dimensioned to substantially enclose the latch pin, the latch pin including a handle at a proximal end thereof, there further being a handle housing for enclosing the handle when the latch pin is in the extended position, wherein the handle housing includes a cover and a hinge connecting the cover to the handle housing, the cover being movable between an open position and a closed position relative to the handle housing, and, when the latch pin is in the retracted position, the cover is in the open position and the handle extends outside the handle housing beyond the cover, and, when the latch pin is in the extended position, the cover is in the closed position and the handle housing encloses the handle.

3. The hitch guide of claim 2, in which the latch pin includes an annular flat disc fastened to the pin at an intermediate location along the length of the pin, the disc including a flat notch along an edge thereof corresponding to a segment of the disc, the latch pin having a distal tip wherein the tip has a beveled face, the latch pin housing including an elongated flat surface inside the housing and extending along the length thereof, whereby the flat notch abuts against the flat surface and moves along the flat surface during the movement of the latch pin between the retracted and extended positions, and, whereby the abutting movement of the flat notch on the elongated surface prevents rotation of the latch pin about the axis of the pin to ensure that the beveled face of the tip of the pin remains facing in a rearward direction.

4. The hitch guide of claim 1 wherein the latch pin bias means or the leveling block bias means is a coil spring.

5. The hitch guide of claim 4 wherein the latch pin bias means and the leveling block bias means are both coil springs.

* * * * *